United States Patent [19]

Imazeki et al.

[11] 4,368,532
[45] Jan. 11, 1983

[54] MEMORY CHECKING METHOD

[75] Inventors: Ryoji Imazeki, Hachioji; Michiya Inoue, Hino, both of Japan

[73] Assignee: Fujitsu Fanuc Limited, Tokyo, Japan

[21] Appl. No.: 173,726

[22] Filed: Jul. 30, 1980

[30] Foreign Application Priority Data

Aug. 1, 1979 [JP] Japan .................................. 54-98268

[51] Int. Cl.³ ........................................... G06F 11/10
[52] U.S. Cl. ....................................... 371/21; 371/51
[58] Field of Search ............................. 371/51, 38, 21

[56] References Cited

U.S. PATENT DOCUMENTS

| | | | |
|---|---|---|---|
| 3,887,901 | 6/1975 | Moore | 371/51 |
| 4,016,409 | 4/1977 | Kim | 371/51 |
| 4,038,537 | 7/1977 | Cassarino, Jr. et al. | 371/51 |
| 4,196,770 | 4/1980 | Benton et al. | 371/51 |

Primary Examiner—Charles E. Atkinson
Attorney, Agent, or Firm—Staas & Halsey

[57] ABSTRACT

A method of checking a memory in a computer system having memory for storing at least one logical block composed of a plurality of words, and a processor for retrieving data from the memory to perform a memory check wherein the method includes inserting an operational control word into the logical block in advance, sequentially subjecting each word in the logical block to a prescribed operation, such as an exclusive-OR operation applied to corresponding ones of the bits in each word, and then determining whether or not the result of the operation is the same as a predetermined value. The operational control word, before being inserted into the logical block, is determined in such a manner that the result of the operation will be equivalent to a predetermined value, such as all "0"s.

9 Claims, 7 Drawing Figures

Fig. 3A

| | CONTENTS OF EACH WORD | | | | | | | |
|---|---|---|---|---|---|---|---|---|
| $W_1$ | 0 | 1 | 0 | 0 | 1 | 0 | 1 | 0 |
| $W_2$ | 1 | 0 | 1 | 0 | 1 | 0 | 1 | 0 |
| $W_3$ | 0 | 0 | 0 | 0 | 0 | 1 | 0 | 1 |
| $W_4$ | 1 | 1 | 0 | 1 | 1 | 1 | 0 | 1 |
| $OCW_i$ | 0 | 0 | 1 | 1 | 1 | 0 | 0 | 0 |

Fig. 3B

| OPERATION STEP | CONTENTS OF OPERATIONAL REGISTER 3C | | | | | | | |
|---|---|---|---|---|---|---|---|---|
| STEP 1 | 0 | 1 | 0 | 0 | 1 | 0 | 1 | 0 |
| STEP 2 | 1 | 1 | 1 | 0 | 0 | 0 | 0 | 0 |
| STEP 3 | 1 | 1 | 1 | 0 | 0 | 1 | 0 | 1 |
| STEP 4 | 0 | 0 | 1 | 1 | 1 | 0 | 0 | 0 |
| STEP 5 | 0 | 0 | 0 | 0 | 0 | 0 | 0 | 0 |

Fig. 4A

| | CONTENTS OF EACH WORD | | | | | | | |
|---|---|---|---|---|---|---|---|---|
| $W_1$ | 0 | 1 | 0 | 0 | 1 | 0 | 1 | 0 |
| $W_2$ | 1 | 0 | 1 | 0 | 1 | 0 | 1 | 0 |
| $W_3$ | 0 | 0 | 0 | 0 | 0 | 1 | 0 | 1 |
| $W_4$ | 1 | 1 | 0 | 1 | 1 | 1 | 0 | 1 |
| $OCW_i$ | | | | | | | | |

Fig. 4B

| OPERATION STEP | CONTENTS OF THE OPERATIONAL REGISTER 3C | | | | | | | |
|---|---|---|---|---|---|---|---|---|
| 1 | 0 | 1 | 0 | 0 | 1 | 0 | 1 | 0 |
| 2 | 1 | 1 | 1 | 0 | 0 | 0 | 0 | 0 |
| 3 | 1 | 1 | 1 | 0 | 0 | 1 | 0 | 1 |
| 4 | 0 | 0 | 1 | 1 | 1 | 0 | 0 | 0 |

MEMORY CHECKING METHOD

BACKGROUND OF THE INVENTION

This invention relates to a method of checking a memory, and more particularly to a method of checking a memory such as a read-only memory (ROM) or a memory for both read and write operations which is used primarily for reading only.

It is general practice, in systems that require high reliability to perform a check of read-out information, as by a parity check procedure, in order to prevent the erroneous system operation which can occur if false information is read out of a memory because of a malfunctioning memory element or some other problem. Generally the parity check method proceeds in the following manner. It should first be noted that a parity bit generating circuit and a parity check circuit are required, and that these are provided for in the computer processor. When data is written, the parity generating circuit forms a parity bit for each word which is to be stored in the memory, and causes the parity bit to be stored in the prescribed region of the memory. When the data is read out from the memory, the parity check circuit executes a parity check. Thus when data from the processor is written in the memory, the parity bit generating circuit forms a parity bit in accordance with odd or oven parity, and writes the parity bit in the prescribed region of the memory, which shares the same address as the data. Then, when the processor designates the address and the data is read out, the parity check circuit checks the data and issues an alarm if an error is detected. When this occurs the processor is interrupted by a well known method. In general, instruction words handled by a general micro-processor are composed of eight bits. This means that the number of bits which construct one word is increased to nine, since one bit must be added for the parity bit in the aforesaid parity check. On the other hand, in numerical control apparatus a read-only memory is used to store permanent data, such as a program for numerical control, and the read-only memory is almost always constructed of eight bits. That is to say, the read-only memory is composed of $8 \times n$ bits.

As is apparent from above-mentioned description, it is necessary to use the read-only memory ($8 \times n$ bits) and a memory element constructed of $1 \times n$ bits, wherein the read-only memory is used for storing the instruction words and the memory element is used for storing the parity bits. However, there is no memory element constructed of $1 \times n$ bits available. For this reason, it is inevitable to substitute the read-only memory for the memory element ($1 \times n$ bits), thereby substantially increasing the amount of hardware required.

It is also apparent that only ⅛ of the memory capacity is employed for the parity check, a fact which does not allow the memory to be used to the fullest possible extent. Moreover, in a comparatively small-scale system, the hardware for generating the parity bits and for checking them occupies a significant part of the overall hardware.

BRIEF SUMMARY OF THE INVENTION

Accordingly, it is an object of the present invention to provide a memory checking method capable of affording a great reduction in the memory region which is necessary for the inspection of the memory in the data processing unit which uses the read-only memory as main storage and hence, a method which permits the effective utilization of memory capacity.

It is another object of the present invention to provide a memory checking method which does not require a parity bit generating circuit, a parity check circuit and hardware for substituting a read-only memory for a memory constructed of $1 \times n$ bits, thereby reducing the amount of hardware required for inspection of the memory.

It is still another object of the present invention to provide a memory checking method which enables a memory check through the steps of incorporating, as required, operational control words in a logical block consisting of a plurality of words, executing a predetermined operation in connection with each word in the logical block, and deciding whether or not the result of the operation is the same as a predetermined value.

It is a further object of the present invention to provide a memory checking method which enables a memory check through the steps of determining an operational control word in such a manner that the result of an operation attains a specified value, such as all "0"s, when a predetermined operation is executed in connection with each word in a logical block, and then inserting the operational control word into the logical block.

Other features and advantages of the invention will be apparent form the following description taken in connection with the accompanying drawings.

BRIEF DESCRIPTION OF THE DRAWINGS

FIG. 3A is a diagram illustrating a case in which one block consists of five words, and shows the content of each of the words $W_1$ through $W_4$ and the content of an operational control word;

FIG. 3B is a diagram illustrating the corresponding relationships between operational steps and the contents of operational register 3c of FIG. 2 at the time of a memory check;

FIG. 4A is a diagram illustrating the contents of words $W_1$ through $W_4$ in a logical block which consists of five words;

FIG. 4B is a diagram illustrating the corresponding relationships between operational steps and the contents of operational register 3c of FIG. 2 when an operational control word is generated.

DETAILED DESCRIPTION OF THE PREFERRED EMBODIMENT

Figure 1:
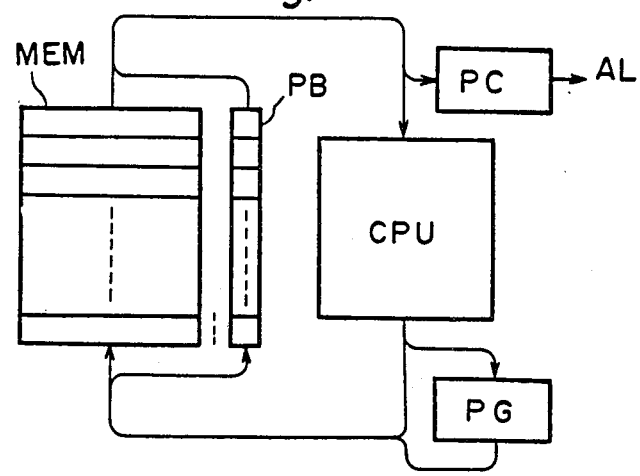
FIG. 1 illustrates a memory checking method by means of the conventional parity check operation.

The conventional parity check method can be understood from FIG. 1. Illustrated in the Figure are a central processing unit CPU, a parity bit generating circuit PG, a memory MEM, a parity bit memory region PB, and a parity check circuit PC. In this system the central processing unit CPU is provided with the parity bit generating circuit PG and parity check circuit PC. When data is to be written in the memory MEM, the parity bit generating circuit PG generates a parity bit for each word to be stored in the memory MEM, and causes the parity bit to be stored in the parity bit memory region PB. The parity check circuit executes a parity check when data is read out from the memory MEM. More specifically, when data from the central processing unit CPU is written in the memory MEM, the parity bit generating circuit PG generates a parity bit in accordance with odd or even parity, and writes the parity bit in the parity bit memory region PB having the same address as the data. When data is read out from a region of the memory MEM whose address has been designated by the central processing unit CPU, the parity check circuit checks this data and issues an alarm if the data is erroneous. An interrupt signal is then sent to the central processing unit by known means.

For even parity in the conventional method, a parity bit is generated and added to one word of data so as to make the total number of "1" bits an even number in that one word of data. Thus, if the number of "1" bits is odd, a parity bit of "1" is generated and added to the word, and if the number of "1" bits is even, a parity bit of "0" is generated and added to the word. Conversely, for odd parity, a parity bit is generated, and added to one word of data, so as to make the total number of "1" bits an odd number in that word. If the number of "1" bits is odd, a parity of "0" is generated and added to the word, and if the number of "1" bits is even, a parity bit of "1" is generated and added to the word.

Figure 2:
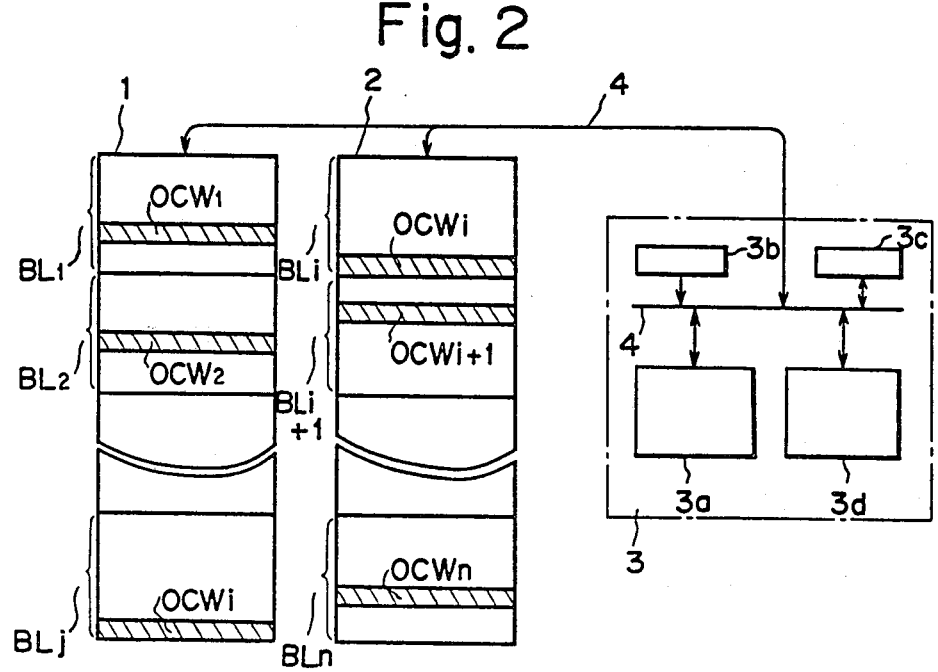
FIG. 2 is a simplified block diagram for illustrating the execution of a memory checking method in accordance with the present invention.

In contrast, the method of checking a memory in accordance with the present invention is illustrated simply in FIG. 2. The illustrated system includes a read-only memory (ROM) 1 for storing a control program or the like, a random access memory (RAM) 2 which stores data such as machining data for numerical control and which is used primarily for a read-only operation, a processor 3, and a common bus line 4. The read-only memory 1 and random access memory 2 each store at least one logical block made up of a plurality of words. In this case the read-only memory 1 stores logical blocks $BL_1$ through $BL_j$, and the random access memory 2 stores logical blocks $BL_i$ through $BL_n$. $OCW_1$ through $OCW_n$ denote operational control words for adjusting the results of operations, as will be described later. These words are inserted in the appropriate logical blocks as necessary. The processor 3 includes an operational unit 3a, operational registers 3b, 3c, and a control unit 3d, and is adapted to execute a predetermined operation on each word that comprises the logical block. Each word is read out from the read-only memory 1 and random access memory 2, and processor 3 checks the memory by determining whether or not the result of an operation is equivalent to a predetermined specified value. The operation referred to above can be an arithmethical operation such as addition or subtraction, a logical operation such as an AND, OR or exclusive-OR operation, or any suitable combination of these operations. The specified value mentioned above can be, for example, all "0"s or all "1"s. Accordingly, if operational control words are not present, the result of the operations applied successively to each word in the logical block will not be equivalent to the specified value, such as all "0"s. In such a case, the operational control words $OCW_1$ through $OCW_n$ would be determined so as to make the result of the operations all "0"s, and the operational control words so determined would then be written in the read-only memory 1 and the random access memory 2 at the same time as the other information.

Before a memory checking operation in accordance with the invention is described, it will be assumed that m 8-bit words are stored in each logical block $BL_1$ through $BL_n$, that the specified value mentioned above is all "0"s for the eight bits, and that the operation performed by the central processing unit on each read-out word is a logical operation, namely an exclusive-OR operation performed sequentially on the words which constitute each logical block.

The processor 3, making use of idle time, first reads out sequentially from the read-only memory 1 each word that forms the logical block $BL_1$, and performs a prescribed operation. Thus the first word $W_1$ is read out from the logical block $BL_1$ and set in the operational register 3b. Next, the operational unit 3a takes the exclusive OR between corresponding ones of the bits forming the contents of the operational registers 3b, 3c (the content of operational register 3c initially being all "0"s), and the result of this operation is stored in operational register 3c. In this way the first word $W_1$ is set in the operational register 3c. Next, the second word $W_2$ is read out and set in operational register 3b in the manner described above, the operational unit 3a takes the exclusive OR between corresponding ones of the bits in the contents of the operational registers 3b, 3c, and the result of the operation is again stored in the operational register 3c. Thereafter, and in the same fashion, the third word $W_3$, fourth word $W_4$... m-th word $W_m$ are read out sequentially, the exclusive-OR operation is executed for corresponding ones of the bits in the operational registers 3b, 3c and the results of the operations are set in the operational register 3c. After the m-th word $W_m$ has been operated upon, a determination is made as to whether the content of operational register 3c is all "0"s; if it is, the content of the register is cleared, the words comprising the next logical block $BL_2$ are read out sequentially, and each word is processed as described above. If the result of a series of operations is not all "0"s, however, this is determined to represent an error.

It should be noted that when the exclusive-OR operation is applied successively to each bit in the words that constitute the logical blocks, as in the above case, the number of corresponding "1" bits in all words $W_1$ through $W_m$ will be either odd or even in number. If even, the corresponding bit in the result of the operation will be a "0"; if odd, the corresponding bit in the result will be a "1".

The memory checking method of the present invention will be understood more clearly from the drawings of FIG. 3. FIG. 3A is an example in which a block comprises five words, and shows the content of words $W_1$ through $W_4$, and the content of an operational control word $OCW_i$. FIG. 3B illustrates the corresponding relationships between operational steps and the contents of the operational register 3c when an exclusive-OR operation is executed.

When the first word $W_1$ (01001010) is read out and then set in the operational register 3b of FIG. 2, the operational unit 3a takes the exclusive OR between corresponding ones of the bits in the content of operational register 3b and in the content (initially all "0"s) of operational register 3c, and sets the result of the operation i.e., (01001010), in the operational register 3c. This completes Step 1 in FIG. 3B. Next, and in identical fashion, the second word $W_2$ (10101010) is read out and set in operational register 3b, after which the operational unit 3a takes the exclusive OR between corresponding ones of the bits in the contents of operational registers 3b, 3c (the content of the latter register being the result 01001010 of the preceding operation), and then sets the result of the operation i.e., (11100000), in the operational register 3c. This completes Step 2 in FIG. 3B. This process continues until each word has been read out and each bit of each word has been subjected to the exclusive-OR operation. If the memory is free of errors, the content of the operational register 3c will be all "0"s, as shown in Step 5 of FIG. 3B, after the last word in the logical block has been processed. The memory is erroneous if the content of operational register 3c is not all "0"s.

The foregoing description relates to the memory check procedure, but exactly how the operational control words are generated and written takes place as follows. To simplify the description, however, it will be assumed that one logical block consists of m words.

When the words $W_1, W_2 \ldots$ constituting each of the logical blocks $BL_i, BL_{i+1} \ldots BL_n$ are written in the random access memory 2, the processor 3 takes the exclusive OR between corresponding ones of each bits in each word sequentially. Thus, the first word $W_1$, at the same time that it is written in the random access memory, is set in operational register 3b. The processor takes the exclusive-OR between corresponding ones of the bits of the word $W_1$ in the content of operational register 3b and in the content of operational register 3c (whose content is initially all "0"s), and sets the result in operational register 3c. The second word $W_2$, when it is written in the random access memory, is likewise set in the operational register 3b, the processor takes the exclusive-OR between corresponding ones of the bits in this operational register and in operational register 3c, and the result is again set in operational register 3c. The processing continues in exactly the same manner up to the word $W_{m-1}$. After this word has been written in the random access memory and subjected to the exclusive-OR operation with the result of the immediately preceding operation, the writing of data in the logical block $BL_i$ will be complete if the content of the operational register 3c at this time is written in logical block $BL_i$ as the operational control word $OCW_i$. Thereafter, processing each logical block in exactly the same manner sets an operational control word at the end of each block, all of such blocks being written in the random access memory 2.

FIG. 4 is useful in describing the generation of operational control words in accordance with the present invention. FIG. 4A shows the contents of four words $W_1$ through $W_4$ in a block of five words. FIG. 4B illustrates the corresponding relationships between operational steps and the contents of the operational register 3c when an exclusive-OR operation is executed.

The first word $W_1$ (01001010), at the same time that it is written in the random access memory 2 of FIG. 2, is set in operational register 3b. The processor takes the exclusive-OR between corresponding ones of the bits of the word $W_1$ in the content of operational register 3b and in the content (initially 00000000, i.e., all "0"s) of operational register 3c, and sets the result, which is 01001010, in the operational register 3c. This completes step 1 in FIG. 4B. Next, and in the same manner, the second word $W_2$ (10101010) is set in register 3b at the same time that it is written in the random access memory, the processor takes the exclusive-OR between corresponding ones of the bits of the word $W_2$ in the content of operational register 3b and in the content (now 01001010, i.e., the result of the immediately preceding operation) of operational register 3c, and sets the result, which is 11100000, in the operational register 3c. This completes Step 2 in FIG. 4B. Thereafter, if each word is operated upon in the above manner as it is written into the random access memory, the content of the operational register 3c will be 00111000 after the fourth word $W_4$ has been processed (Step 4 of FIG. 4B). It is this 8-bit content of the operational register 4B that is written into the random access memory 2 as the operational control word $OCW_i$.

Figure 5:
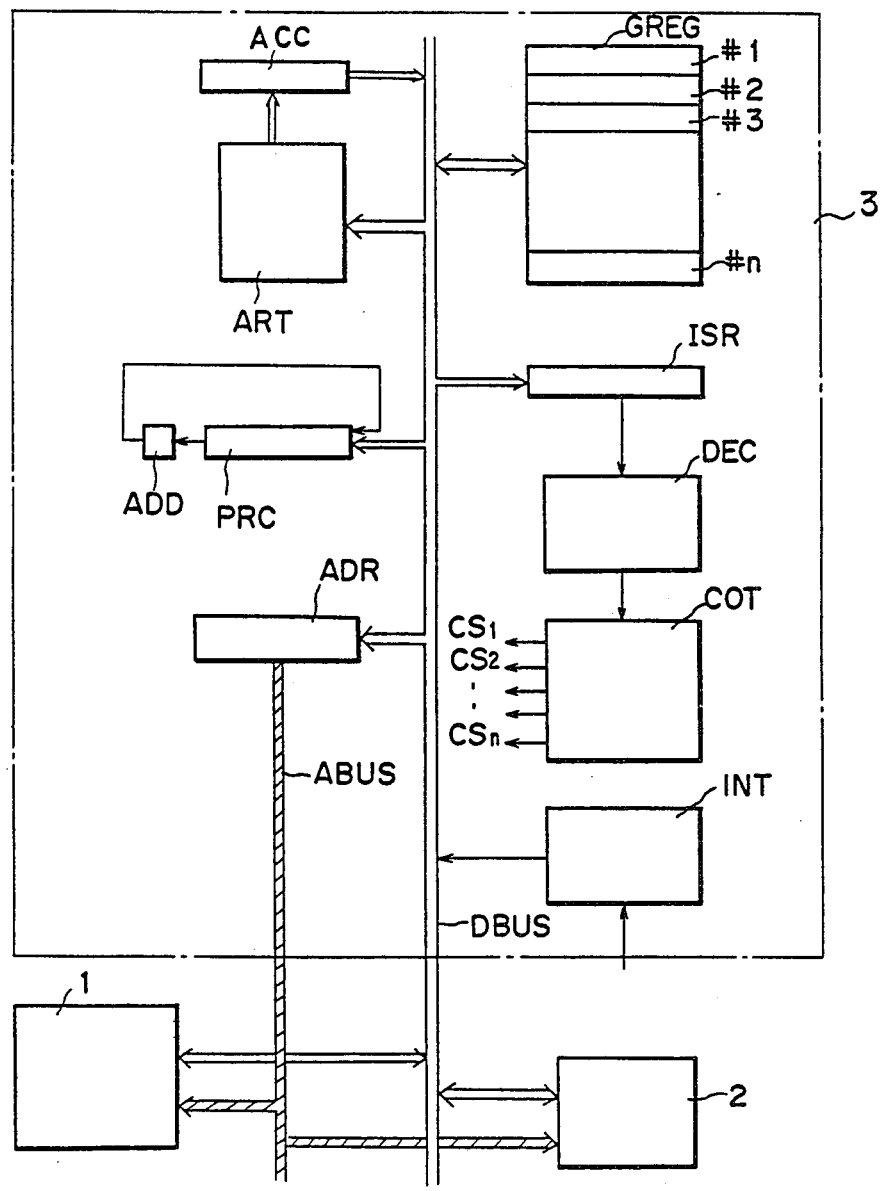
FIG. 5 is a block diagram of a processor.

A block diagram of a processor for practicing the memory checking method of the present invention is shown in FIG. 5. In addition to the processor, designated at numeral 3, the diagram shows the read-only memory ROM 1, and the random access memory RAM 2.

In the processor 3, GREG denotes a general purpose register composed of registers #1 through #n for storing the results of operations, indices and the like. An operational unit ART, corresponding to the operational unit 3a in FIG. 2, executes operations such as addition or subtraction or an exclusive-OR operation on corresponding ones of bits that make up words. ACC is an accumulator for temporarily storing the results of operations. ADR is an address register for storing an address in memory from which data is read out or in which data is written and for delivering the address to the address bus ABUS. PRC is a program counter which stores the address of the next instruction word and ADD is an adder. The adder ADD increments the content of the program counter PRC by one step each time an instruction is executed. The content of the program counter PRC is capable of being changed by the instruction word, such as by a jump instruction. ISR denotes an instruction register which is set by an instruction word read out from ROM 1 or RAM 2, the instruction word arriving on the data bus DBUS. DEC is a decoder which decodes the instruction word and delivers the decoded result to a control circuit COT. The latter circuit produces a control signal $CS_i$ (where $i=1$ to N) in accordance with the instruction word on the basis of the decoded result from the decoder DEC, and causes a unit, such as the operational unit ART, to execute an operation in accordance with the instruction word.

When the computer power source is turned on, the processor 3 is placed under the control of the memory check program being stored in the read-only memory 1 and excecutes a memory check. Specifically, when the power is turned on, the first address in the ROM 1 is set in the program counter PRC. As a result, the data stored at the first address of ROM is read out from the memory and stored temporarily in register #1, which corresponds to the operational register 3b of FIG. 2. Next, operational unit ART takes the exclusive-OR between respective ones of the bits in the content of register #1 and in the content of register #2 (initially all "0"s) which corresponds to the operational register 3c in FIG. 2. The result of this operation is set in register #2, and the content of register #3 (initially all "0"s) is advanced by one. The content of register #3 is then compared with the value m to determine whether or not they are the same. The content of the program counter PRC also is incremented by one by the adder ADD. Thereafter, and in similar fashion, the data at the second, third . . . mth addresses is read out under the control of the memory check program, corresponding ones of the bits are subjected to the exclusive-OR operation, the content of register #3 is incremented by one, and its content is compared with m to determine if they are identical. When they are identical, a determination is made as to whether the content of register #2 is all "0"s). If it is, the content of register #3 is cleared and the abovesaid memory check operation is executed in identical fashion for the next logical block. If the content of register #2 is not all "0"s, an alarm is issued immediately.

The entire memory of ROM 1 is checked for errors in the manner described above and, when the check is completed, RAM 2 is subjected to the memory check in the same fashion. The process is completed when each block in ROM 1 and RAM 2 has been checked.

The operational control words are generated by starting the operational control word generating program at the time that the data is written in the particular memory. Since the operational control words are incorporated beforehand in the control program of ROM 1, the operational control words are generated only when machining program data is written in RAM 2. In such case the operational control word generating program is stored in ROM 1.

In the case described above the memory check was initiated when the power source was turned on, but it is also possible to utilize the idle time of the processor to effect the memory check. If the amount of such idle time is short, then the idle time would be utilized to check the memory block by block in order; a greater amount of idle time would permit the memory to be checked for all the blocks at once. It should be noted, however, that the most preferable method is to confirm the correctness of the memory by performing the memory check at the time that the power source is turned on.

It should be apparent from the foregoing that the present invention enables a memory check through a method including the steps of incorporating operational control words as necessary in logical blocks composed of a plurality of words, executing a prescribed operation in connection with each word of the logical blocks, and determining whether or not the result of the operation is the same as a predetermined value. Thus, in accordance with the characterizing feature of the present invention, it is not necessary to add a check bit to each word in a logical block; instead, it suffices merely to prepare a single operational control word for each single logical block, thereby minimizing the regions of the memory that are used exclusively for the memory check, the result being more effective utilization of memory capacity. A separate processor exclusively for the memory check is not necessary. Hence a single processor can be employed for both the memory check and for any other operation, such as a numerical control operation, and the memory check can be conducted using idle time, or just after the power source has been turned on. This results in greater economy without an increase in hardware.

While the present invention has been described and illustrated for a case in which each logical block is composed of m words, the number of words in each block need not be the same. Moreover, while the words in each logical block were described as being physically interconnected, this need not always be the case. However, such interconnection is preferable since it is generally required to know the location of the defective memory device whenever a defect in the memory is discovered. In addition, it is advantageous if the size of a logical block is made to agree with the length of address region of the memory device. For example, as a 16K bit (8 bit×2 kW) ROM, a single operational control word will suffice, if the size of the logical block is equal to 2K bytes.

It should also be noted that the present invention is not limited to the case described above where it was described that an operational control word is incorporated in each block. It is not necessary to insert a logical control word in a logical block that provides a specified operational result even if the block has not been furnished with an operational control word. Moreover, the present invention is not limited to the above described case where only one operational control word was inserted in each logical block, for example two operational control words may be inserted if desired.

As many apparently widely different embodiments of the present invention may be made without departing from the spirit and scope thereof, it is to be understood that the invention is not limited to the specific embodiments thereof except as defined in the appended claims.

What we claim is:

1. A method of checking a read only memory in a computer system, the read only memory storing at least one logical block composed of a plurality of words, the computer system having a processor for reading data from the read only memory, for performing a prescribed operation, and for checking the read only memory, said method comprising the steps of:
    (a) determining an operational control word in such a manner as to render the result of the prescribed operation equivalent to a predetermined value;
    (b) storing the operational control word in said at least one logical block stored in the read only memory;
    (c) sequentially reading each of the plurality of words in said at least one logical block;
    (d) sequentially subjecting each of the plurality of words in said at least one logical block to the prescribed operation by employing the processor;
    (e) comparing the result of the prescribed operation, after each of the plurality of words has been subjected to the prescribed operation, with the predetermined value; and
    (f) determining whether the read only memory is operating normally on the basis of the comparison result.

2. A method of checking a read only memory as set forth in claim 1, wherein the prescribed operation is a logical exclusive OR operation which is performed between each bit of the read-out word and each corresponding bit of the previous result.

3. A method of checking a read only memory as set forth in claim 2, wherein the predetermined value is all "0"s.

4. A method of checking a read only memory as set forth in claim 2, wherein the predetermined value is all "1"s.

5. A method of checking a read only memory storing a logical block including a plurality of words, said read only memory in a computer system which also includes a processor for reading data from the read only memory to perform the memory check, said method comprising the steps of:
    (a) writing, in the read only memory, data comprising of plurality of words except for a selected word;
    (b) performing, in sequence, a prescribed operation on each of the plurality of words except the selected word, the prescribed operation rendering a first result;

(c) selecting an operational word based upon the first result so that if the prescribed operation is performed on the first result and the operational control word, a predetermined value is generated;

(d) writing, in the read only memory, the operational control word as the selected word;

(e) reading out of the read only memory the plurality of words;

(f) performing, in sequence, the prescribed operation on each of the plurality of words to provide a second result; and (g) determining whether the second result is equal to the predetermined value.

6. A method as set forth in claim 5, further comprising the step of (h) generating an error signal if the second result is not equal to the predetermined value.

7. A method as set forth in claim 5, wherein the prescribed operation is an arithmetic operation.

8. A method as set forth in claim 5, wherein the prescribed operation is a logical operation.

9. A method as set forth in claim 8, wherein the logical operation is an EXCLUSIVE OR operation performed by setting an initial previous result to be zero and by performing an EXCLUSIVE OR operation on each of the plurality of words by taking the EXCLUSIVE OR between corresponding ones of the word bits and the bits of the previous result, wherein the predetermined value is selected to be all zeros.

* * * * *

UNITED STATES PATENT AND TRADEMARK OFFICE
CERTIFICATE OF CORRECTION

PATENT NO. : 4,368,532
DATED : JANUARY 11, 1983
INVENTOR(S) : RYOJI IMAZEKI ET AL.

It is certified that error appears in the above-identified patent and that said Letters Patent is hereby corrected as shown below:

On the

Tittle page, [57] Abstract,
          line 2, after "having" insert --a--;
          line 5, after "check" insert --,--.

Col. 1, line 11, after "reliability" insert --,--.
Col. 2, line 27, change "form" to --from--.
Col. 3, line 50, change "arithmethical" to --arithmetical--.
Col. 6, line 37, change "N" to --n--.

Signed and Sealed this

Seventh Day of June 1983

[SEAL]

Attest:

DONALD J. QUIGG

Attesting Officer      Acting Commissioner of Patents and Trademarks